United States Patent
Parker (10) Patent No.: US 9,323,755 B2
(45) Date of Patent: Apr. 26, 2016

(54) SECONDARY CONTENT

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 430 days.

(21) Appl. No.: 13/561,175

(22) Filed: Jul. 30, 2012

(65) Prior Publication Data

US 2014/0032565 A1   Jan. 30, 2014

(51) Int. Cl.
*G06F 17/30* (2006.01)

(52) U.S. Cl.
CPC ...... *G06F 17/30056* (2013.01); *G06F 17/3005* (2013.01); *G06F 17/30029* (2013.01); *G06F 17/30817* (2013.01); *G06F 17/30828* (2013.01); *G06F 17/30873* (2013.01)

(58) Field of Classification Search
CPC .............. G06F 17/30902; G06F 17/30144; G06F 17/30174; G06F 11/2082; G06F 17/30094; G06F 17/30867; G06F 17/3002; G06F 17/30056; G06F 17/30321; G06F 17/30778; G06F 17/30029; G06F 17/30991; G06F 17/30026; G06F 17/30843; G06F 2216/15
USPC .............................. 705/705–780; 725/1–153
See application file for complete search history.

(56) References Cited

U.S. PATENT DOCUMENTS

| | | | | |
|---|---|---|---|---|
| 8,060,631 B2 * | 11/2011 | Collart et al. | ................. | 709/229 |
| 8,195,650 B2 * | 6/2012 | Sheshagiri et al. | ........... | 707/722 |
| 8,364,671 B1 * | 1/2013 | Sinton et al. | .................. | 707/728 |
| 8,763,060 B2 * | 6/2014 | Jerremy | ............. | H04N 21/4126 725/110 |
| 8,775,647 B2 * | 7/2014 | Collart et al. | ................. | 709/229 |
| 8,793,256 B2 * | 7/2014 | McIntire et al. | .............. | 707/741 |
| 2011/0063503 A1 * | 3/2011 | Brand et al. | .................. | 348/500 |
| 2011/0083073 A1 * | 4/2011 | Atkins | ............... | H04N 21/4147 715/704 |
| 2012/0011550 A1 * | 1/2012 | Holland | .......................... | 725/78 |
| 2012/0179683 A1 * | 7/2012 | Balassanian | .................. | 707/737 |
| 2013/0170813 A1 * | 7/2013 | Woods et al. | ................. | 386/200 |
| 2013/0276008 A1 * | 10/2013 | Wu et al. | ......................... | 725/14 |
| 2013/0325954 A1 * | 12/2013 | Cupala | ................... | G06F 3/041 709/204 |

* cited by examiner

*Primary Examiner* — Michelle Owyang (57) ABSTRACT

A method includes receiving primary content, wherein the primary content includes a video program. The method also includes identifying attributes of the primary content, identifying secondary content based on the identified attributes of the primary content, and indexing the primary content to the secondary content. The method also includes identifying a primary user device associated with the primary content and an associated secondary user device. A request for secondary content may be received from the secondary user device. The method further includes providing the secondary content at the secondary user device synchronized with receipt of the primary content at the primary user device.

20 Claims, 9 Drawing Sheets

SECONDARY CONTENT

BACKGROUND

As content is viewed or listened to at home, another computing device (e.g. tablet, PDA, or computer) may be used concurrently. Multi-screen video architecture generally provides cross-platform access to a single content source. Among other benefits, multi-screen video provides consumers with the possibility to watch video on a screen/device of their choice. For example, a live broadcast television event may be available for viewing on various types of mobile devices.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein relate to determining and providing secondary content on a secondary display. The secondary content may be determined based on primary content, which may be concurrently displayed on a primary display. The primary content may be provided to the primary display via a broadcast network or a content delivery network. The secondary content may be generated/identified/gathered at a secondary screen server. The primary and/or secondary content may be delivered via radio, television, a movie theater screen, or streamed to a computer.

Figure 1:
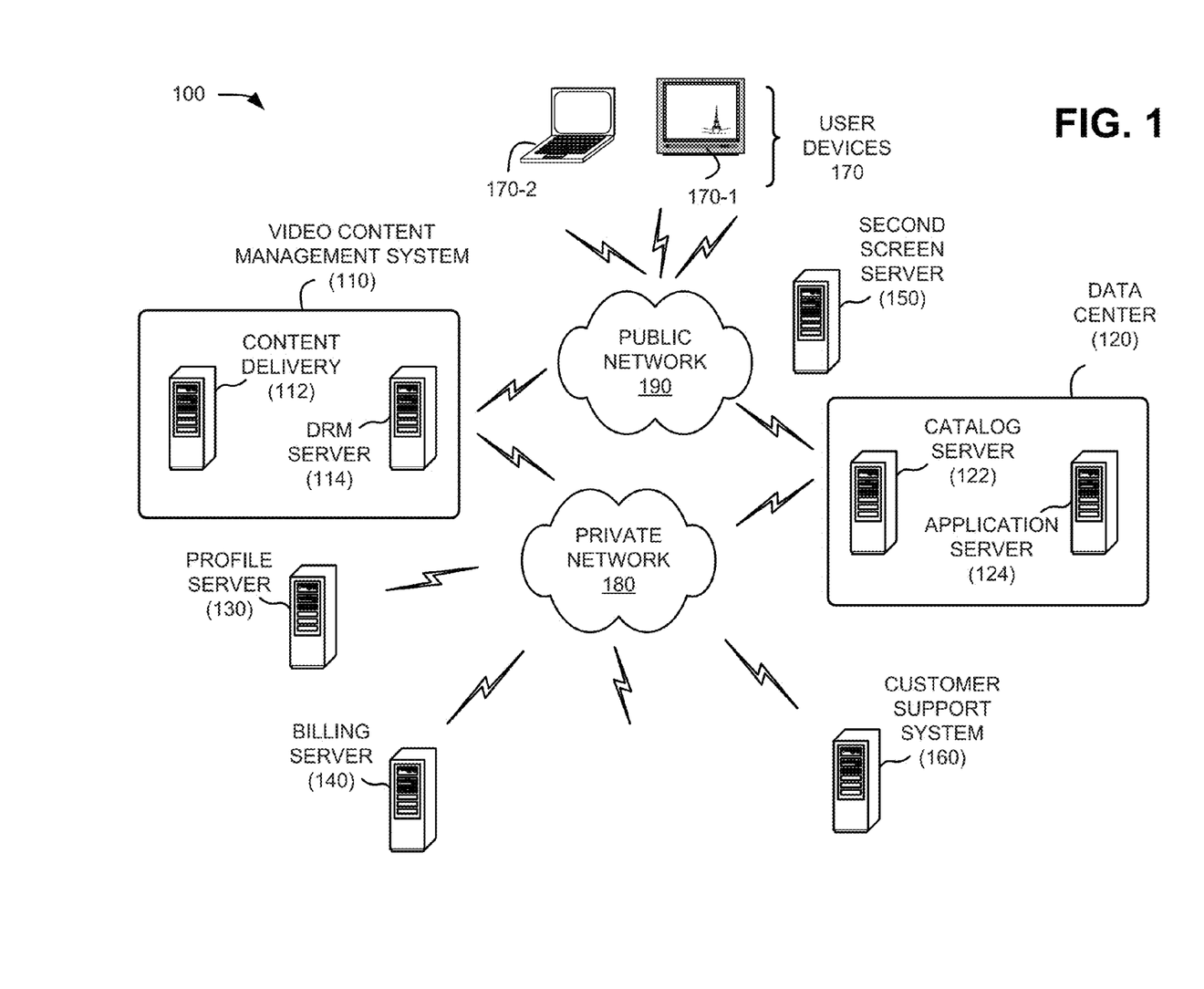
FIG. 1 is an exemplary network in which systems and/or methods described herein may be implemented.

FIG. 1 is an exemplary network 100 in which systems and/or methods described herein may be implemented. As illustrated, network 100 may include a video content management system (VCMS) 110, a data center 120, a profile server 130, a billing server 140, a second screen server 150, a customer support system 160, user devices 170 (including a primary user device 170-1 and a secondary device 170-2, referred to in singular, in general, as user device 170, and in plural as user devices 170), a private network 180, and a public network 190. The particular arrangement and number of components of network 100 shown in FIG. 1 are illustrated for simplicity. In practice there may be more VCMSs 110, data centers 120, profile servers 130, billing servers 140, second screen server 150, customer support systems 160, user devices 170, and/or networks 180/190. Components of network 100 may be connected via wired and/or wireless links.

VCMS 110 may aggregate content, process content, and distribute content. In one implementation, VCMS 110 may include a content delivery system 112 and a digital rights management (DRM) server 114. VCMS 110 may aggregate content and transcode content into a digital format suitable for consumption on particular user devices 170. For example, VCMS 110 may include a transcoding device to convert an audio, video, or graphic file from one format to another (e.g., from one bit rate to another bit rate, from one resolution to another, from one standard to another, from one file size to another, etc.). VCMS 110 may also encrypt data and communicate with DRM server 114 to enforce digital rights.

Content delivery system 112 may deliver content from a backend server to user devices 170. In one implementation, content delivery system 112 may include a streaming server that provides streaming data packets (e.g., via a streaming uniform resource locator (URL)) to user devices 170 (e.g., via public network 190). In one implementation, a streaming URL may be session-based, such that each URL may be used only once for one user device 170 for security purposes.

DRM server 114 may issue, validate, and/or enforce DRM licenses to a device client, such as an application running on one of user devices 170 (e.g., on primary user device 170-1 and/or secondary user device 170-2). In implementations herein, DRM server 114 may communicate with user device 170 to authenticate a user of user device 170, the particular user device 170, and/or an application residing on user device 170. For example, DRM server 114 may request/receive login information associated with the user, and compare the login information with stored information to authenticate the user. Additionally, or alternatively, DRM server 114 may request/receive device information (e.g., a unique device identifier) associated with user device 170, and may compare the device information with stored information to authenticate user device 170.

Data center 120 may manage the authorization, selection, and/or purchase of multimedia content by a user of user device 170. As shown in FIG. 1, data center 120 may include a catalog server 122 and an application server 124. In one implementation, data center 120 may be accessed by user devices 170 via public network 190.

Catalog server 122 may provide a catalog of content for users (e.g., of user devices 170) to order/consume (e.g., buy, rent, or subscribe). In one implementation, catalog server 122 may collect and/or present listings of content available to user devices 170. For example, catalog server 122 may receive content metadata, such as lists or categories of content, from VCMS 110. Catalog server 122 may use the content metadata to provide currently-available content options to user devices 170. Catalog server 122 may provide the content metadata to user device 170 directly or may communicate with user device 170 via second screen server 150 and/or application server 124.

Application server 124 may provide a backend support system for mobile applications residing on user devices 170. For example, application server 124 may permit user device 170 to download a video application that may permit a user to find content of interest or play downloaded or streaming content. The video application may enable user device 170 to present to a user of user device 170 information received from data center 120 in an interactive format to allow selection of particular content. Application server 124 may provide content metadata, such as lists or categories of content for digital content, such as downloads and streaming content. Also, application server 124 may authenticate a user who desires to purchase, rent, or subscribe to content. In one implementation, the interactions between application server 124 and user device 170 may be performed using the hypertext transfer protocol (HTTP) or the secure HTTP (HTTPS) via public network 190.

Profile server 130 may store user profile information for users (e.g., users of user devices 170). The user profile information may include various information regarding a user, such as login information (e.g., a user identifier and a password), billing information, address information, types of services to which the user has subscribed, user ratings of content, user reviews of content, a list of content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may manage charging users for services provided via network 100. Billing server 140 may include, for example, a payment processing component, a billing component, and/or a settlement component.

Figure 7:
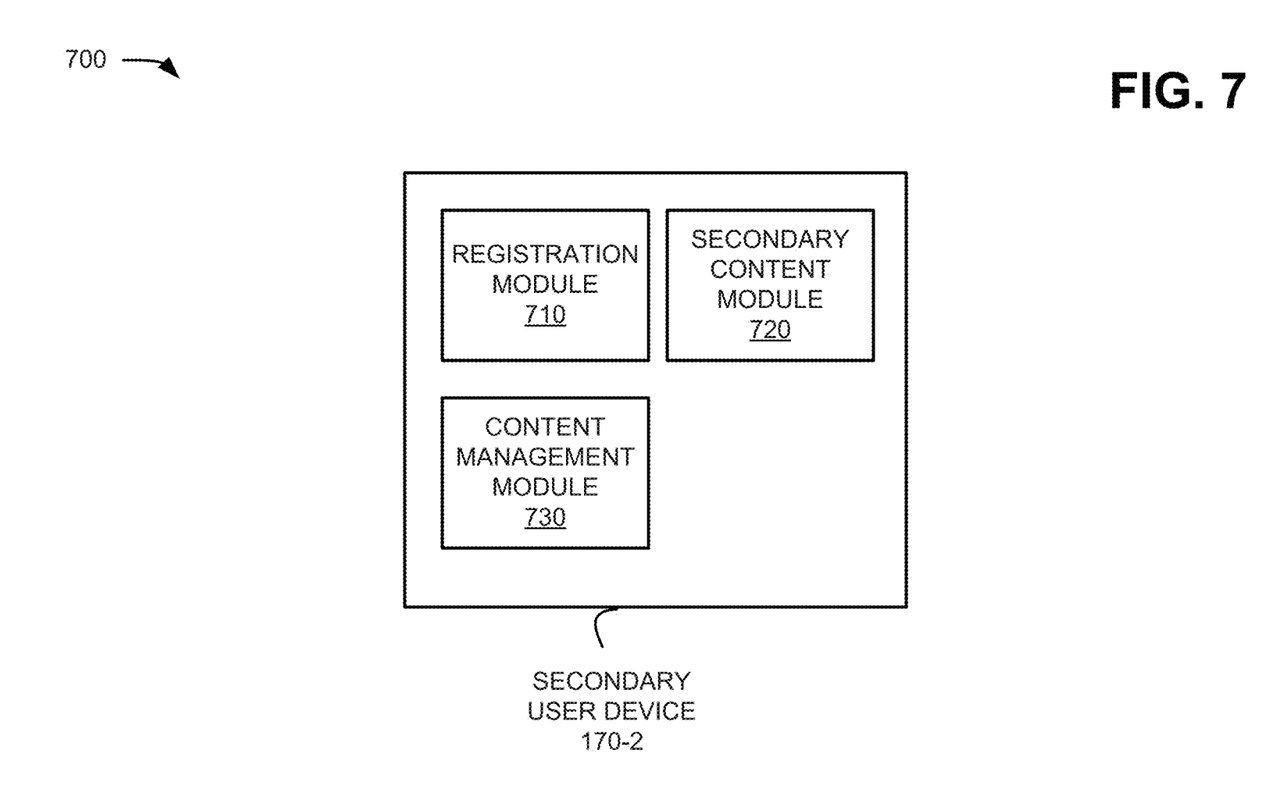
FIG. 7 is a diagram of exemplary functional components of a secondary user device of FIG. 1.

Second screen server 150 may determine secondary content and provide backend support, such as described herein with regard to process 700 and FIG. 7, for a second screen application that may be deployed to synchronize the secondary content displayed on secondary user device 170-2 based on primary content displayed at primary user device 170-1. Primary content may include video programs, such as television programs, movies, etc. The primary content may be subdivided into segments or scenes, which include different objects, actors, situations, etc. Secondary content may include biographies of actors in a scene in the video program, informational pop-ups regarding the video, links to content in a scene, clothing worn by the characters in a scene, cars in a scene, information about buildings/geography in the scene, etc. Additionally, other content that is not specific to a scene but relevant to an entire video program may be presented. For example, social media communication regarding the video program (e.g., Twitter posts regarding the movie), informal and/or professional reviews, revenue generated by the movie, recommendations of similar video programs, a video content browser based on the video program, etc.

Second screen server 150 may determine the secondary content based on primary content (displayed at primary user device 170-1) that is provided in association with content delivery system 112, and/or primary content that is provided by a broadcast network (not shown) external to environment 100. The second screen application provides secondary content at secondary user device 170-2 based on primary content that may be concurrently displayed at primary user device 170-1.

Customer support system 160 may solicit and/or receive user feedback, questions, or credit-related requests.

User devices 170 may enable a user to view video content or interact with another user device 170 or a video display device (e.g., a set-top box and/or television). User devices 170 may include, for example, a personal communications system (PCS) terminal (e.g., a smartphone that may combine a cellular radiotelephone with data processing and data communications capabilities), a tablet computer, a personal computer, a laptop computer, a personal digital assistant (PDA), a gaming console, a music playing device, an Internet television, or other types of computation or communication devices. In one implementation, user devices 170 may include client-side applications that enables each user device 170 to communicate with, for example, data center 120 and/or present information received from data center 120 to a user. The client-side application may permit a user of user device 170 to log into an account (e.g., via application server 124), access catalog information (e.g., from catalog server 122), submit an order, and/or consume live streaming video content (e.g., from VCMS 110).

User devices 170 may include multiple user devices 170, such as primary user device 170-1 and secondary user device 170-2, which are configured to be used concurrently with each other based on a second screen application.

Primary user device 170-1 may receive primary content from components of network 100, such as VCMS 110, and from other networks external to network 100, such as a broadcast television network (not shown in FIG. 1). Primary user device 170-1 may include multiple devices configured to operate as a system, such as a set top box and a display, not shown in FIG. 1. Primary user device 170-1 may include a primary user device client side application that may send primary program information to second screen server 150 regarding what is currently being viewed on primary user device 170-1. The primary program information may include a channel that is currently being viewed, a current time at primary user device 170-1, a time of play (i.e., a current time in the program), a video state (e.g., paused, fast forwarding, rewinding, etc.), a digital video recorder (DVR) program currently being played, a state of an associated display (e.g., whether a television is on or off), video source information (e.g., whether user device 170-1 is receiving server based tuning or streaming of content), etc. Primary user device 170-1 may also interact with secondary user device 170-2.

Secondary user device 170-2 may receive secondary content from second screen server 150. The secondary content may be based on content provided currently being viewed at primary user device 170-1. Secondary user device 170-2 may be synchronized (e.g., based on information regarding a program currently being viewed at primary user device 170-1) to display the secondary content approximately at a current (real) time that primary user device 170-1 is displaying primary content on which the secondary content is based.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, second screen server 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a public switched telephone network (PSTN), a satellite network, a fiber optic network, a private WAN, or a combination of the Internet and a private WAN, etc. that is used to transport data. Although shown as a single element in FIG. 1, public network 190 may include a number of separate networks that function to provide services to user devices 170.

In implementations described herein, secondary content may be determined based on primary content, which may be concurrently displayed on a primary display. The primary content may be provided to the primary display via a broadcast network or a content delivery network. The secondary content may be generated/identified/gathered at a secondary screen server.

Figure 2:
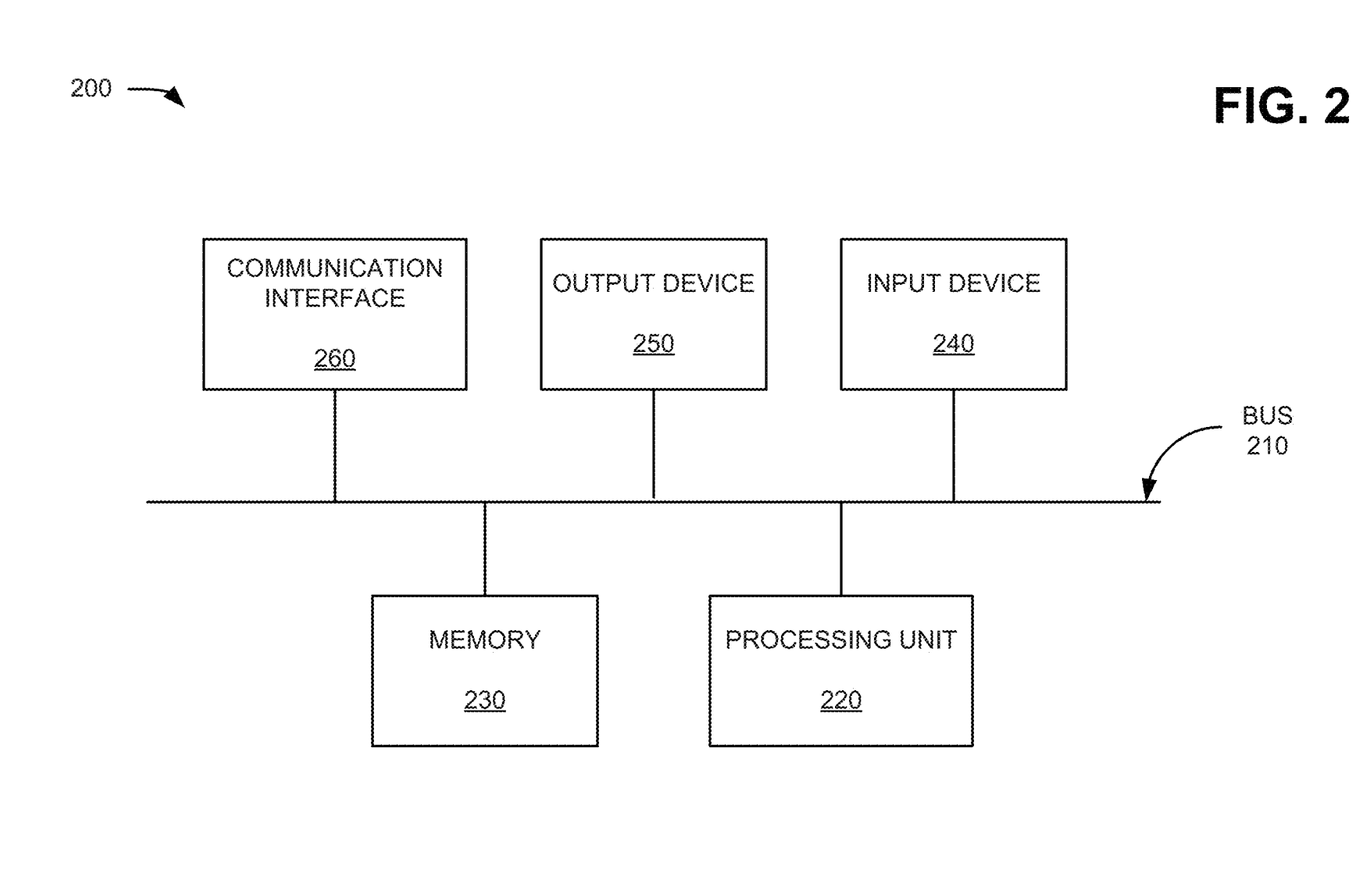
FIG. 2 is a block diagram of exemplary components of a device that may correspond to one of the devices of FIG. 1.

FIG. 2 is a diagram of exemplary components of a device 200 that may correspond to VCMS 110, content delivery system 112, DRM server 114, data center 120, catalog server 122, application server 124, profile server 130, billing server 140, second screen server 150, customer support system 160, or user device 170. Each of VCMS 110, content delivery system 112, DRM server 114, data center 120, catalog server 122, application server 124, profile server 130, billing server 140, second screen server 150, customer support system 160, and user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may permit an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
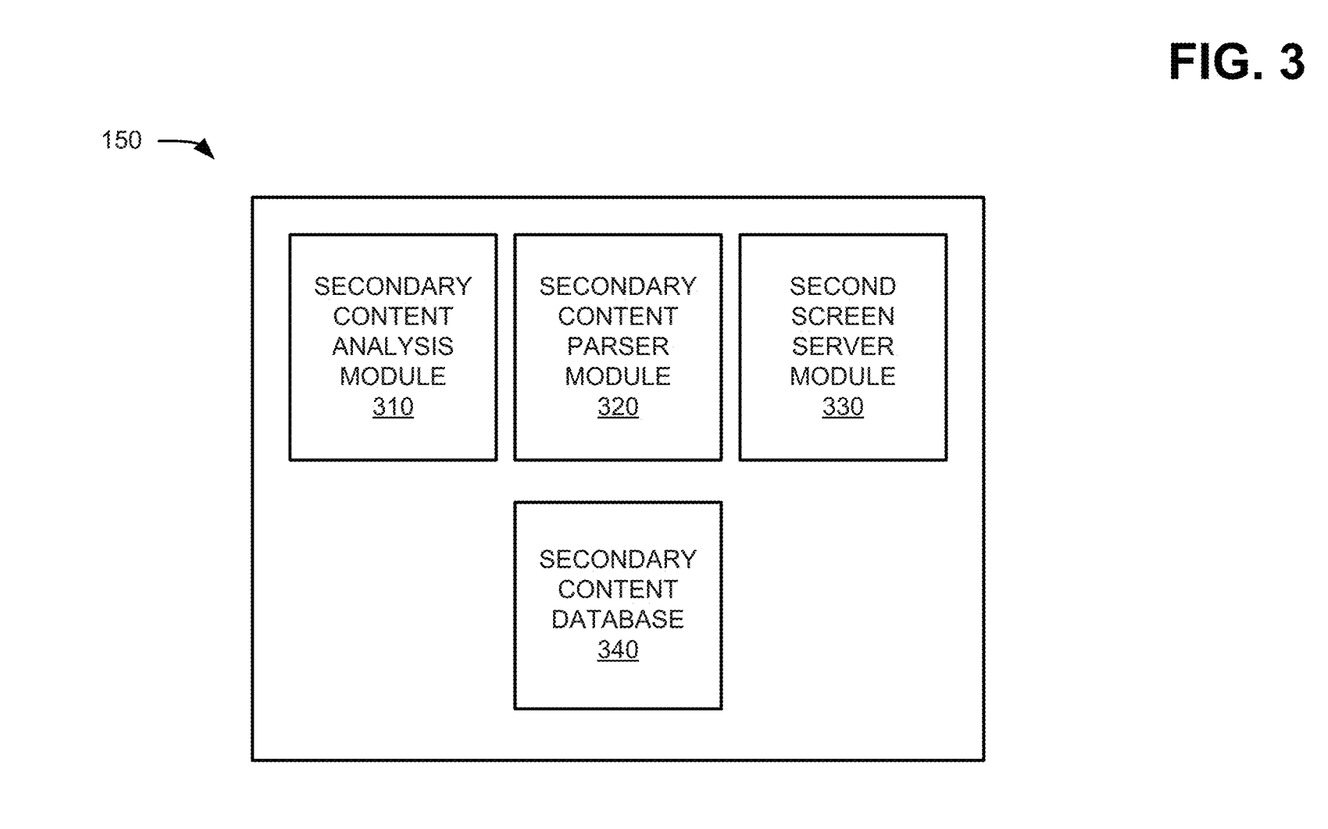
FIG. 3 is a diagram of exemplary functional components of the second screen server of FIG. 1.

FIG. 3 is a diagram of exemplary functional components of second screen server 150. In one implementation, the functions described in connection with FIG. 3 may be performed by one or more components of device 200 (FIG. 2). As shown in FIG. 3, second screen server 150 may include a secondary content analysis module 310, a secondary content parser module 320, a second screen server module 330, and a secondary content database 340.

Secondary content analysis module 310 may analyze primary content to determine attributes of the primary content on a general basis (i.e., for the entire video program) or a per segment or time basis (e.g., a scene by scene basis). For example, secondary content analysis module 310 may receive primary content from a source, such as a broadcast network or content delivery network (not shown in FIG. 3), which may also provide the primary content to primary user device 170-1. Secondary content analysis module 310 may analyze primary content that is currently being distributed (e.g., streamed, broadcast, etc.) to primary user device 170-1 (i.e., in real time). Alternatively, secondary content analysis module 310 may analyze primary content that is to be stored for later access by primary user device 170-1.

Secondary content analysis module 310 may analyze primary content at a time that the primary content is ingested into a content delivery network to identify specific attributes of the primary content. Secondary content analysis module 310 may perform actions, such as determining attributes of the video program. Secondary content analysis module 310 may instances at which types of particular attributes occur in the primary content. For example, secondary content analysis module 310 may record a time of the particular attribute in the primary content and associate it with the components of the primary content (e.g., a particular time (or times) in the video program that each actor or object appears). Secondary content analysis module 310 may perform analysis of the primary content to identify different attributes based on factors that are relevant to each attribute, and subsequently identify a time at which the attribute occurs. For example, secondary content analysis module 310 may analyze a motor vehicle based on a shape, color, manufacturer, etc., of the motor vehicle. Secondary content analysis module 310 may perform image color assessment, speech analysis, video metadata collection, action analysis, text analysis in a video program, architectural analysis, building location analysis, facial recognition, terrain analysis, music analysis, and/or motion analysis, to determine attributes of the video program on a per segment basis. Secondary content analysis module 310 may also identify a specific screen coordinate of particular objects (e.g., a Cartesian position of a person, clothing, hats, cars, etc.). Secondary content analysis module 310 may also identify multiple attributes in a same segment.

Secondary content parser module 320 may identify secondary content based on the primary content. For example, secondary content parser module 320 may search databases, the Internet, other video programs, etc., based on search terms determined from the attributes of the primary content. Secondary content parser module 320 may analyze subscribers viewing habits and Internet use associated with the primary content to determine interesting content that may be displayed on secondary user device 170-2. For example, secondary content parser module 320 may identify other video programs that persons associated with a user of the user devices 170 has viewed (e.g., programs that social media associates who have expressed an interest in the video program, such as Facebook friends, have browsed. watched, are currently watching, and/or purchased), uniform resource locators (URLs) that the subscriber and/or other subscribers have observed/accessed in a time associated with viewing of a video program (e.g., URL that other subscribers view in a preceding 72 hours before the user watches a video program), content that is commonly accessed on secondary user devices 170-2 (of other subscribers) when the primary content is being viewed (or shortly after the primary content is viewed), secondary content that has never been used previously by the subscriber, etc.

Second screen server module 330 may present secondary content to secondary user devices 170-2 (in real time) while a user is also viewing the primary content on primary user device 170-1. Second screen server module 330 may stream the secondary content to secondary user device 170-2 or direct streaming servers in the backend of a network, such as content delivery system 112, to provide secondary content to secondary user device 170-2. Second screen server module 330 may receive the secondary content from secondary content parser module 320. Alternatively, second screen server module 330 may retrieve secondary content that has been previously indexed and stored (e.g., by secondary content parser module 320) in association with the primary content from secondary content database 340.

Secondary content database 340 may include secondary content and/or information regarding secondary content that is indexed based on related primary content and/or attributes that may be included in the primary content. Secondary content database 340 may be collocated or otherwise associated with a primary content repository, such as content delivery system 112 in network 100.

Figure 4:
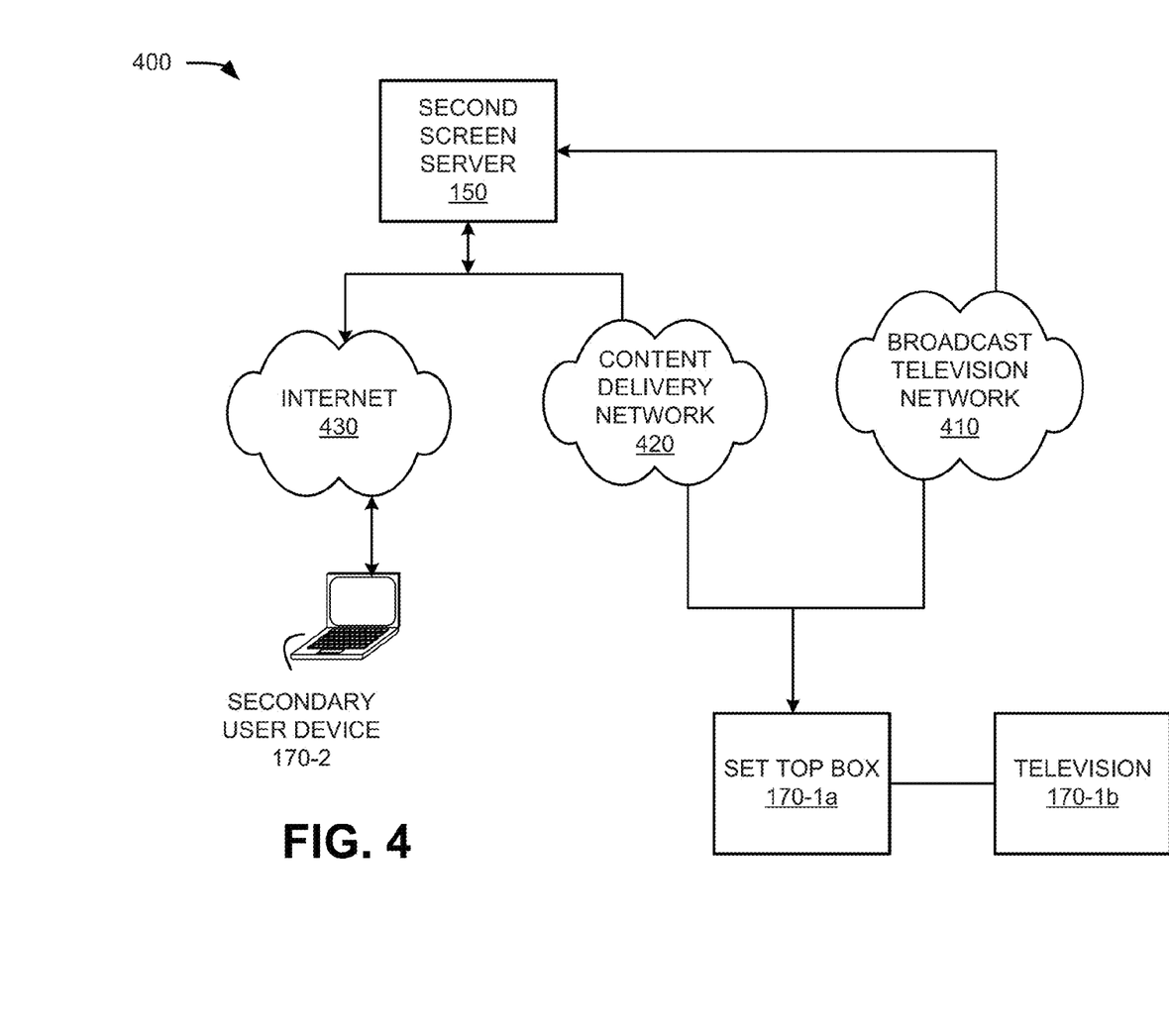
FIG. 4 is a block diagram of exemplary communications between components within an environment to support secondary content based on primary content from a content delivery network.

FIG. 4 is a diagram of an environment 400 that includes exemplary communications that support the provisioning of secondary content, based on primary content displayed at a primary user device 170-1, to a secondary user device 170-2. In one implementation, the functions described in connection with FIG. 4 may be performed by one or more components of device 200 (FIG. 2). As shown in FIG. 4, environment 400 may include second screen server 150, broadcast television network 410, content delivery network 420, Internet 430, primary user device 170-1 (shown in this embodiment as a set top box 170-1a and a television 170-1b) and secondary user device 170-2.

Although not shown, content delivery network 420 may include components of (or the entire) network 100, such as VCMS 110, data center 120, profile server 130, billing server 140, second screen server 150, customer support system 160, and user device 170.

Broadcast television network 410 may include an external network to a content provider's system, or network. In some instances, the content provider may not have knowledge of (or control over) the primary content that is provided via broadcast television network 410. Although environment 400 is shown to include broadcast television network 410, other external networks to a provider network may be implemented to provide the primary content, such as different content provider networks, etc.

As shown in FIG. 4, primary user device 170-1 (in particular, in this instance, set top box 170-1a) may receive primary content from content delivery network 420 and/or broadcast television network 410. Second screen server 150 may also receive the primary content from content delivery network 420 and/or broadcast television network 410 at approximately a same time that the primary content is provided to primary user device 170-1. Second screen server 150 may receive the primary content and perform analysis on the primary content to determine secondary content. The secondary content includes content related to the primary content. Second screen server 150 may retrieve secondary content that has been indexed to the primary content and stored in an associated database (e.g., secondary content may be stored with associated attributes, in secondary content database 340). Second screen server 150 may also perform real time analysis of the primary content and create and store metadata along with the ingested video content.

When primary user device 170-1 receives/views primary content from content delivery network 420, second screen server 150 may store the secondary content with or near the same delivery device/server for the primary content. As the primary content is viewed or listened to on primary user device 170-1, second screen server 150 may send secondary content (that is indexed to the primary content) via an Internet 430 connection (or other network connection) to secondary user device 170-2 (e.g. tablet, PDA, or computer) that is concurrently being used. The secondary content may be used to enhance a viewer experience by providing additional information about the primary content or recommendations based on the primary content. In different implementations, the primary and secondary content may be delivered via radio, television, movie theater screen, or streamed to a computer.

Figure 5:
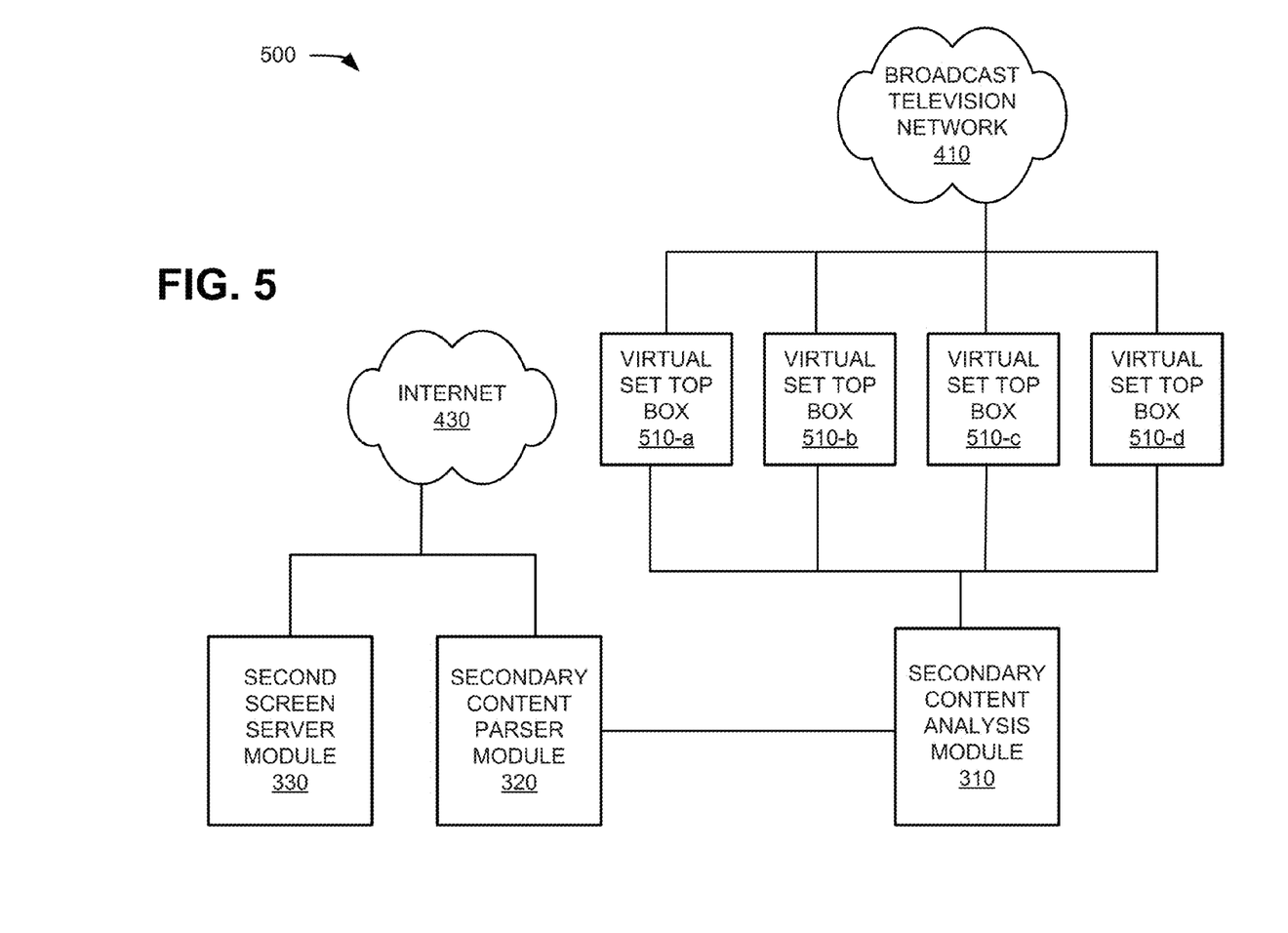
FIG. 5 is a block diagram of exemplary communications between components within an environment to support secondary content based on primary content from a broadcast television network.

FIG. 5 is a diagram of exemplary functional block diagram of a system 500 for determining secondary content based on primary content that is received from an external network, such as broadcast television network 410, and providing the secondary content to secondary user device 170-2 in real time. System 500 includes secondary content analysis module 310, secondary content parser module 320, second screen server module 330, broadcast television network 410, an Internet 430 connection, a plurality of virtual set top boxes 510a-510d. Modules 310-330 may be components of second screen server 150. In one implementation, the functions described in connection with FIG. 5 may be performed by one or more components of device 200 (FIG. 2).

Virtual set top boxes 510a-510d may include receivers that may monitor each available external channel or content source that is external to service provided in association with a service provider that provides the secondary content (e.g., primary content (i.e., content that is to be viewed on primary user device 170-1) that originates outside of network 100). The external channels may be received as primary content at primary user device 170-1 while secondary content may be provided via network 100.

As shown in FIG. 5, content may be received from broadcast television network 410 (i.e., not ingested into content delivery network 420). If the primary content is not ingested into content delivery network 420, second screen server 150 determines the attributes of the primary content in "real time" to support the display of secondary content when the primary content is delivered via an external network (e.g., broadcast television network 410 or primary content provided "over the top" of a content provider system).

Secondary content analysis module 310 may monitor primary content provided via the external networks to determine attributes of the primary content. For example, secondary content analysis module 310 may monitor broadcast television channels received at plurality of virtual set top boxes 510a-510d and perform secondary content analysis on video programs that have not been previously analyzed. Secondary content analysis module 310 may continuously monitor available content and determine what primary content is being broadcast. Secondary content analysis module 310 may determine attributes for primary content that has not already been sampled to continually build the pool of primary content for which it has indexed attributes. Secondary content analysis module 310 may store the indexed primary content, including particular attributes of the primary content, in an associated database.

Secondary content parser module 320 may identify secondary content based on the primary content. For example, secondary content parser module 320 may receive the indexed primary content. Secondary content parser module 320 may search for related content based on the indexed attributes. For example, secondary content parser module 320 may search the Internet 430 for content that includes keywords based on the indexed attributes (e.g., an actor name, a clothing brand, etc.). Secondary content parser module 320 may also search available content databases and catalogs to determine recommendations (that may be presented as secondary content) based on the attributes of the primary content.

In some instances, such as news broadcasts and emergency alerts, secondary content analysis module 310 may monitor broadcast channels and perform analysis on the content and secondary content parser module 320 may aggregate other relevant news content to display on at secondary user device 170-2.

Second screen server module 330 may provide the secondary content to secondary user device 170-2 via an Internet 430 connection. Second screen server module 330 may provide the secondary content synchronized with primary content displayed at primary user device 170-1, as described in detail below with respect to FIG. 6, with regard to primary user device 170-1 and FIG. 7 with regard to secondary user device 170-2.

Figure 6:
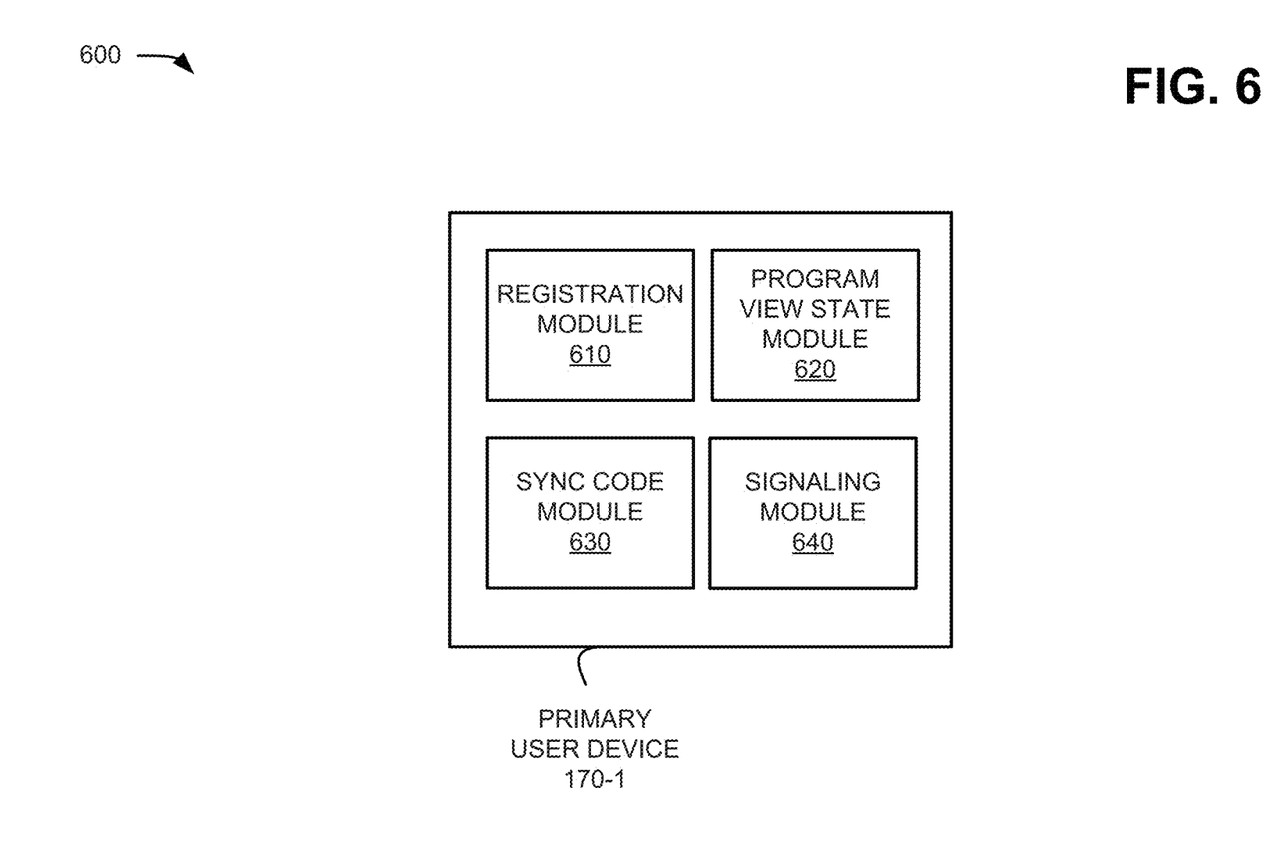
FIG. 6 is a diagram of exemplary functional components of a primary user device of FIG. 1.

FIG. 6 is a functional block diagram of primary user device 170-1. In one implementation, the functions described in connection with FIG. 6 may be performed by one or more components of device 200 (FIG. 2). Primary user device 170-1 may include a registration module 610, a program view state module 620, a sync code module 630, and a signaling module 640.

Primary user device 170-1 may provide information to allow synchronization of secondary content received at secondary user device 170-2 with primary content viewed at primary user device 170-1. In some implementations, primary use device 170-1 may include a main user display system that is used for viewing content, such as a television and set top box.

Registration module 610 may register primary user device 170-1 with second screen server 150. Registration module 610 may identify a type of device in which it is installed and present its credentials to second screen server 150. This information may include a location of the service (advertising domain and channel definition for the region). Second screen server 150 may provide a second screen synchronization code to primary user device 170-1 at the time primary user device 170-1 is registered with second screen server 150. Alternatively, when primary user device 170-1 is provisioned, the second screen synchronization code may simultaneously be sent to second screen server 150 (from a provisioning device in network 100).

Program view state module 620 may identify a state of the primary content (i.e., a video program that is currently being viewed on primary user device 170-1) including information, such as what channel is being viewed, current time at the set top, time of play, video state, what DVR video is being played, a state of the television, etc. Program view state module 620 may identify additional information including, for example, a provider for primary content (e.g., a serving cable company) and a location where the primary content is being viewed. This may allow primary content delivered via a provider for primary content, who is not a party to the second screen process provided at secondary user device 170-2, to be identified.

Sync code module 630 may implement secondary content to primary content viewing synchronization (i.e., secondary user device 170-2 to primary user device 170-1 synchronization). Sync code module 630 may provide a unique code (second screen synchronization code) to secondary user device 170-2. Sync code module 630 may receive the second screen synchronization code at the time primary user device 170-1 is registered with second screen server 150.

Signaling module 640 may implement (in some instances, set top box based) signaling for primary user device 170-1. Signaling module 640 may send information to second screen server 150 regarding what is being viewed (primary content) on primary user device 170-1 at that time.

FIG. 7 is a functional block diagram of secondary user device 170-2. In one implementation, the functions described in connection with FIG. 7 may be performed by one or more components of device 200 (FIG. 2). Secondary user device 170-2 may include a secondary registration module 710, a secondary content module 720, and a content management module 730.

Secondary user device 170-2 may receive and display secondary content, synchronized with primary content, from second screen server 150. Secondary content may be implemented using a second screen application at secondary user device 170-2 and a second screen process, which includes primary user device 170-1, second screen server 150 and supporting content providing devices in network 100.

Secondary registration module 710 may register secondary user device 170-2 with second screen server 150 at a time that the second screen application is launched. Secondary registration module 710 may identify a type of device in which it is installed (i.e., a device type for secondary user device 170-2) and presents its credentials to second screen server 150. If secondary user device 170-2 has not been previously registered, secondary registration module 710 may receive a prompt directing secondary user device 170-2 to synchronize with primary user device 170-1. Secondary user device 170-2 may also de-register at any time and the user may re-register secondary user device 170-2 with second screen server 150 for another primary user device 170-1 (e.g., a different set top box or television).

According to one implementation, secondary registration module 710 may receive a second screen synchronization code associated with primary user device 170-1. For example, secondary registration module 710 may provide a second screen menu that a user may access on secondary user device 170-2. The user may be prompted to enter the second screen synchronization code (e.g. after accessing the code from primary user device 170-1). Secondary registration module 710 may register with second screen server 150, to complete linkage (i.e., real time synchronization of content) between secondary user device 170-2 and primary user device 170-1.

Secondary content module 720 may receive and display secondary content from second screen server 150. Second screen server 150 may determine secondary content based on "looking up" the primary content on a local network guide (e.g., cable network programming guides) and sending secondary content based on the primary content to secondary content module 720 for display. The secondary content may be used to increase the richness of the experience for a viewer of the primary content and may include actor biographies based on scene, informational pop-ups regarding the primary content, links to content in the scene, clothing worn by the characters in the scene, etc.

Content management module 730 may include a search function that enables a user to search for secondary content based on alphanumeric or other characters (e.g., based on attributes of primary content) and, if the content has been analyzed, receive results including secondary content that may be displayed on secondary user device 170-2. According to one implementation, content management module 730 may automatically implement the search function without input from/based on primary user device 170-1 (i.e., secondary user device 170-2 may access secondary content independent of primary user device 170-1).

According to an implementation, content management module 730 may signal primary user device 170-1 (e.g., a set top box, or television), or a streaming server in network 100 that provides primary content to primary user device 170-1 to "fetch" content identified in the secondary content and begin playing the secondary content as primary content on primary user device 170-1 (i.e., if the subscriber wishes to watch content identified in secondary content they may select to play the secondary content at primary user device 170-1 from the second screen application). Additionally, in some instances, the user may select to play the secondary content at secondary user device 170-2 simultaneously with the primary content at primary user device 170-1 (e.g., "behind the scenes" commentary/information that points out noteworthy attributes in a video program).

Figure 8:
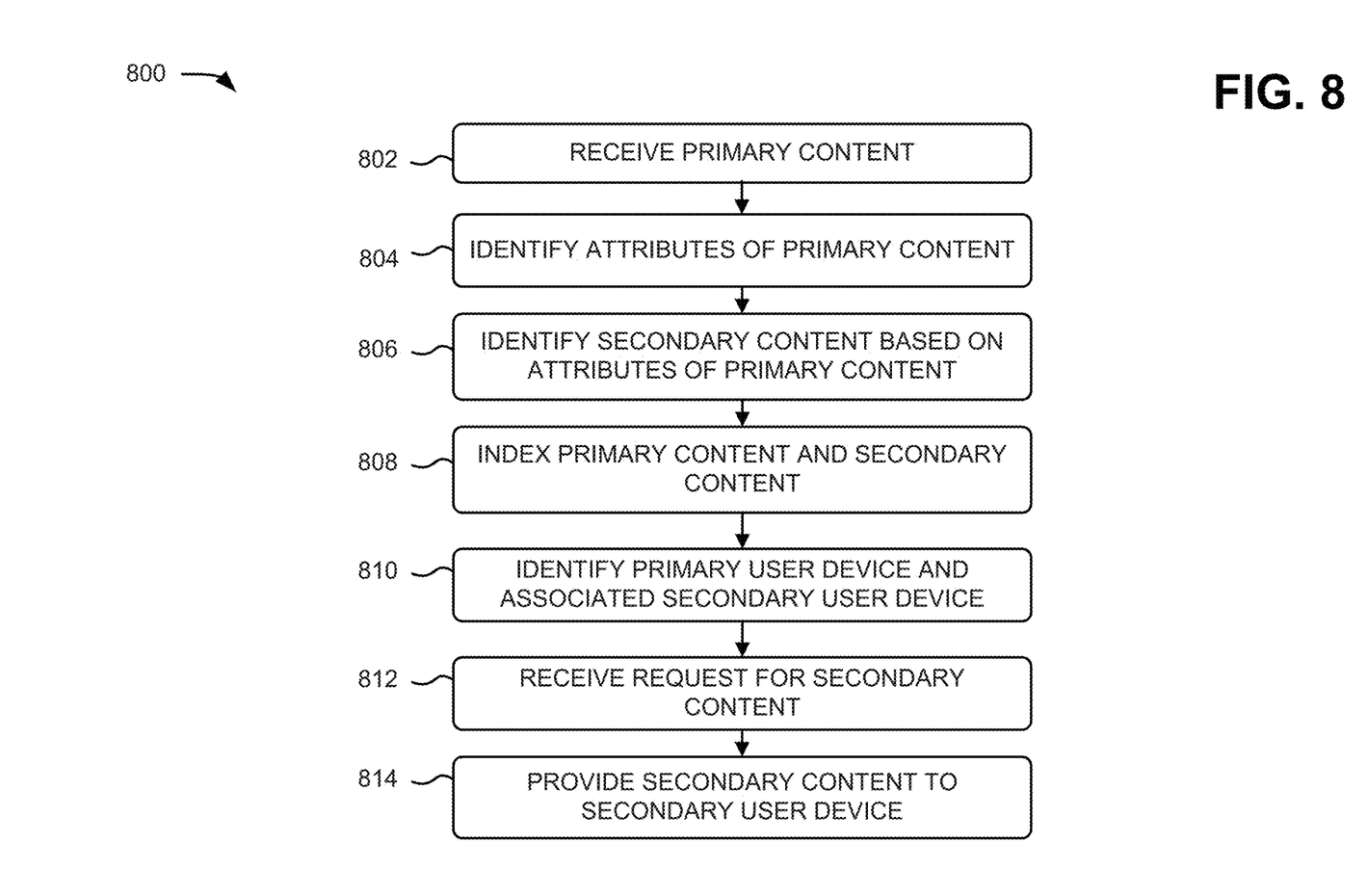
FIG. 8 is a flow chart of an exemplary process for providing server-side support for a secondary content application described herein.

FIG. 8 is a flow chart of an exemplary process 800 for providing secondary content based on primary content to a secondary user device, such as secondary user device 170-2, according to implementations described herein. In one implementation, process 800 may be performed by second screen server 150. In another implementation, some or all of process 800 may be performed by another device or group of devices, including or excluding second screen server 150.

As shown in FIG. 8, second screen server 150 may receive primary content (block 802). For example, second screen server 150 may receive primary content from a network/provider that provides backend access to the primary content (e.g., a network that is associated with the provider of the secondary content, such as content delivery network 420). Second screen server 150 may receive the primary content during ingestion of the primary content (i.e., during processing of the primary content including searching, encoding, metadata labeling, uploading, etc.). Alternatively, second screen server 150 may receive primary content from an external network, such as broadcast television network 410.

At block 804, second screen server 150 may identify attributes of the primary content. For example, second screen server 150 may analyze the primary content on a frame by frame, a scene by scene basis, an entire program basis, etc., to identify attributes of audio and video included in the primary content. Attributes may include particular actors, objects, geographical locations, etc. Second screen server 150 may record a time that each attribute occurs in an associated database or metadata for the primary content.

At block 806, second screen server 150 may identify secondary content based on the attributes of primary content. For example, second screen server 150 may search internal content catalogs for recommendations based on the attributes of the primary content (e.g., one or more attributes of the primary content), such as particular actors, places, commercial items, etc., included in the video program. Second screen server 150 may identify secondary content based on subscriber analytics (e.g., video programs and other content selected by users that select the primary content), Internet activity (e.g., websites visited within a predetermined time window of watching the video program), etc. Second screen server 150 may identify clothing details, automobile details, information on architectural details, geographic details, music details, social media, actor biography, film reviews, or content recommendations, associated with the primary content According to one implementation, in which the primary content is a news broadcast, second screen server 150 may identify related news based on local relevance and/or national relevance. For example, second screen server 150 may identify (block 804) attributes of the primary content that indicate news regarding a particular type of event (e.g., a weather event that affects a region). Second screen server 150 may identify secondary content that includes local news for a particular zip code or set of zip codes (e.g., road closings, etc., due to the weather event) or national news (e.g., news form national television networks).

Second screen server 150 may index the secondary content with the primary content (block 808). For example, second screen server 150 may identify instances in the primary content at which attributes that have corresponding secondary content occur. Second screen server 150 may index the secondary content to the primary content based on a time identified attribute in the primary content (e.g., an index entry may indicate that an actor appears at $15^{th}$ minute to $17^{th}$ minute and $26^{th}$ minute to $34^{th}$ minute of movie, secondary content may include an actor biography). Second screen server 150 may index the attributes based on different categories associated with the time identified attributes, such as actor biographies for actors, geographic information for places in a video program, etc.

Second screen server 150 may identify primary user device 170-1 and associated secondary user device 170-2 (block 810). For example, second screen server 150 may identify primary user device 170-1 and secondary user device 170-2 that have a same screen synchronization code.

At block 812, second screen server 150 may receive a request for secondary content. For example, secondary user device 170-2 may launch a second screen application and request the secondary content based on primary content currently displayed at primary user device 170-1.

Second screen server 150 may send the secondary content, based on the primary content, to secondary user device 170-2 (block 814). Second screen server 150 may send the secondary content synchronized with the primary content. Secondary user device 170-2 may display the secondary content concurrently with the primary content displayed at primary user device 170-1.

Figure 9:
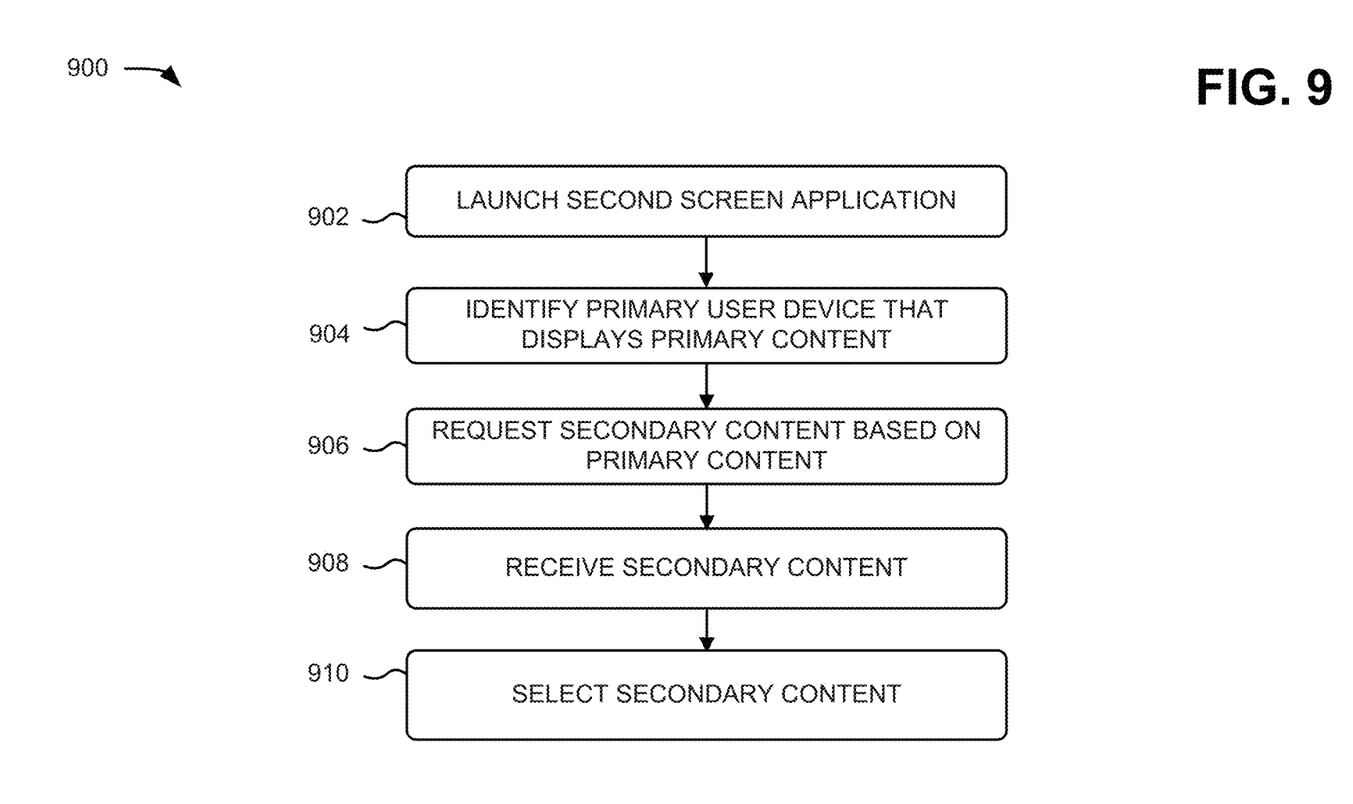
FIG. 9 is a flow chart of an exemplary process for providing client-side support for a secondary content application described herein.

FIG. 9 is a flow chart of an exemplary process 900 for receiving secondary content based on primary content concurrently displayed at a primary user device, such as primary user device 170-1, according to implementations described herein. In one implementation, process 900 may be performed by secondary user device 170-2. In another implementation, some or all of process 900 may be performed by another device or group of devices, including or excluding secondary user device 170-2.

At block 902, secondary user device 170-2 may launch second screen application. Secondary user device 170-2 may identify, to second screen server 150, an associated primary user device 170-1 at which primary content is displayed (block 904). For example, secondary user device 170-2 may provide a second screen synchronization code, received from primary user device 170-1, to second screen server 150.

At block 906, secondary user device 170-2 may request secondary content from second screen server 150. Secondary user device 170-2 may receive secondary content from second screen server 150 (block 908). For example, secondary user device 170-2 may receive supplemental information regarding a video program (primary content) displayed at the primary user device 170-1.

Secondary user device 170-2 may receive an input that selects particular secondary content (block 910). For example, secondary user device 170-2 may receive an input that selects a URL related to the primary content. Second screen server 150 may access the location/site corresponding to the selected URL and provide the requested information.

According to an implementation, the user may select to receive different types of attributes and information at secondary user device 170-2, such as actor biographies, links to URLs associated with clothing, etc., based on the user's preference. Second screen server 150 may provide secondary content based on the primary content and particular user selected categories.

Systems and/or methods described herein may allow substantially precise synchronization of primary content on a first device with secondary content, which is based on the primary content, displayed on a second device. The systems and methods may be implemented and integrated in set top boxes, televisions, and media players to improve the subscriber's experience.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving, at a second screen server device, primary content, wherein the primary content includes a video program;
   identifying, by the second screen server device, attributes of objects in the primary content;
   identifying, by the second screen server device, a primary user device that is receiving the primary content, wherein the primary user device is registered to a user;
   identifying, by the second screen server device, secondary content comprising a particular secondary content based on the identified attributes of the objects in the primary content and subscriber analytics associated with the primary content, wherein the subscriber analytics are based on video programs and content selected by a plurality of other users than the user;
   indexing, by the second screen server device, the primary content based on the identified attributes of the objects in the primary content;
   indexing, by the second screen server device, the secondary content based on the identified attributes of the objects in the primary content;
   storing the primary content and the secondary content in a storage device based on the indexing of the primary content and the indexing of the secondary content;
   identifying, by the second screen server device, a secondary user device registered to the user and coupled to the primary user device;
   receiving, by the second screen server device, a request for the particular secondary content from the secondary user device;
   identifying the particular secondary content from the secondary content in the storage device based on content accessed by respective secondary devices registered to the other users within a predetermined time period of the other users accessing the primary content using respective primary devices registered to the other users; and
   providing, by the second screen server device, the particular secondary content at the secondary user device synchronized with receipt of the primary content at the primary user device in response to the request,
   wherein providing the particular secondary content comprises:
      identifying a video program currently being provided to the primary user device as the primary content, and
      providing the particular secondary content synchronized with the video program.

2. The computer-implemented method of claim 1, wherein identifying the attributes of the objects in the primary content further comprises:
   performing one or more of automobile analysis, clothing analysis, terrain analysis, or architectural analysis on images within the primary content.

3. The computer-implemented method of claim 1, wherein identifying the secondary content further comprises:
   identifying at least one of clothing details, automobile details, architectural details or geographic details, associated with the primary content.

4. The computer-implemented method of claim 1, wherein indexing the secondary content further comprises:
   identifying a time identified attribute in the primary content, wherein the time identified attribute includes an attribute of the primary content and an associated time at which the attribute occurs;
   identifying at least some items of the secondary content based on the time identified attribute; and storing an indicator of the secondary content in association with the time identified attribute.

5. The computer-implemented method of claim 1, wherein identifying the primary user device receiving the primary content and the secondary user device further comprises:
identifying a second screen synchronization code associated with the primary user device and the secondary user device.

6. The computer-implemented method of claim 1, wherein the primary content comprises a news broadcast and identifying the secondary content further comprises:
identifying related news based on one or more of a local relevance or a national relevance.

7. The computer-implemented method of claim 1, wherein identifying the secondary content further comprises:
identifying at least one of music details, social media, actor biography, film reviews, or content recommendations, associated with the primary content.

8. The computer-implemented method of claim 1, wherein identifying the secondary content based on the identified attributes of the objects in the primary content and subscriber analytics associated with the primary content further comprises:
identifying the secondary content via virtual set-top boxes associated with external channels that are external to a service provided by the second screen server device.

9. The computer-implemented method of claim 1, wherein the other users include social media associates of the user.

10. A device, comprising:
a memory to store a plurality of instructions; and
a processor configured to execute instructions in the memory to:
receive primary content, wherein the primary content includes a video program;
identify a primary user device that is receiving the primary content, wherein the primary user device is registered to a user;
analyze the primary content to identify attributes of objects in the primary content;
identify secondary content comprising a particular secondary content based on the identified attributes of objects in the primary content and subscriber analytics associated with the primary content, wherein the subscriber analytics are based on video programs and content selected by a plurality of other users than the user;
index the primary content based on the identified attributes of the objects in the primary content;
index the secondary content based on the identified attributes of the objects in the primary content;
store the primary content and the secondary content in a storage device based on the indexing of the primary content and the indexing of the secondary content;
identify a secondary user device registered to the user and coupled to the primary user device;
receive a request for the particular secondary content from the secondary user device;
identify the particular secondary content from the secondary content in the storage device based on content accessed by respective secondary devices registered to the other users within a predetermined time period of the other users accessing the primary content using respective primary devices registered to the other users; and
provide the particular secondary content at the secondary user device synchronized with receipt of the primary content at the primary user device in responsive to the request,
wherein providing the particular secondary content comprises identifying a video program currently being provided to the primary user device as the primary content, and
providing the particular secondary content synchronized with the video program.

11. The device of claim 10, wherein, when identifying the secondary content, the processor is further configured to:
identify the secondary content based on one or more of video content catalog search activity, or Internet activity, associated with the primary content.

12. The device of claim 10, wherein, when identifying the attributes of objects in the primary content, the processor is further configured to:
identify the attributes of the primary content based on at least one of a Cartesian coordinate, frame by frame, or scene by scene basis.

13. The device of claim 10, wherein, when indexing the secondary content, the processor is further configured to:
identify a time identified attribute in the primary content, wherein the time identified attribute includes an attribute of the primary content and an associated time at which the attribute occurs;
identify at least some items of the secondary content based on the time identified attribute; and
store an indicator of the secondary content in association with the time identified attribute.

14. A non-transitory computer-readable medium including instructions to be executed by a processor, the instructions including one or more instructions, when executed by the processor, for causing the processor to:
receive primary content, wherein the primary content includes a video program;
identify a primary user device that is receiving the primary content, wherein the primary user device is registered to a user;
analyze the primary content to identify attributes of objects in the primary content;
identify secondary content comprising a particular secondary content based on the identified attributes of objects in the primary content and subscriber analytics associated with the primary content, wherein the subscriber analytics are based on video programs and content selected by a plurality of other users than the user;
index the primary content based on the identified attributes of the objects in the primary content;
index the secondary content based on the identified attributes of the objects in the primary content;
store the primary content and the secondary content in a storage device based on the indexing of the primary content and the indexing of the secondary content;
identify a secondary user device registered to the user and coupled to the primary user device;
receive a request for the particular secondary content from the secondary user device;
identify the particular secondary content from the secondary content in the storage device based on content accessed by respective secondary devices registered to the other users within a predetermined time period of the other users accessing the primary content using respective primary devices registered to the other users; and provide the particular secondary content at the secondary user device synchronized with receipt of the primary content at the primary user device in response to the request, wherein providing the particular secondary content comprises identifying a video program currently being provided to the primary user device as the primary content, and providing the particular secondary content synchronized with the video program.

15. The non-transitory computer-readable medium of claim 14, further comprising instructions, when executed by the processor, for causing the processor to:

perform at least one of color analysis, automobile analysis, clothing analysis, terrain analysis, or architectural analysis on the primary content.

16. The non-transitory computer-readable medium of claim 14, further comprising instructions wherein, when identifying secondary content, when executed by the processor, for causing the processor to:

identify the secondary content based on websites visited within a predetermined time window of viewing the primary content.

17. The non-transitory computer-readable medium of claim 14, further comprising instructions which, when identifying the secondary content, when executed by the processor, for causing the processor to:

identify at least one of music details, social media, actor biography, film reviews, or content recommendations, associated with the primary content.

18. The non-transitory computer-readable medium of claim 14, further comprising instructions which, when identifying the secondary content based on the identified attributes of the objects in the primary content and subscriber analytics associated with the primary content, when executed by the processor, for causing the processor to:

identify the secondary content via virtual set-top boxes associated with external channels that are external to a service provided by a second screen server device.

19. The non-transitory computer-readable medium of claim 14, further comprising instructions which, when identifying the primary user device associated with the primary content and the associated secondary user device, when executed by the processor, for causing the processor to:

identify a second screen synchronization code associated with the primary user device and the secondary user device.

20. The non-transitory computer-readable medium of claim 14, wherein the primary content comprises a news broadcast, further comprising instructions which, when identifying the secondary content, when executed by the processor, for causing the processor to:

identify related news based on one or more of a local relevance or a national relevance.

* * * * *